Oct. 2, 1945.    L. E. COFFELT    2,385,967
WATERWHEEL MOUNTING
Filed Sept. 29, 1944    2 Sheets-Sheet 1

INVENTOR.
LOWELL E. COFFELT
BY
G. F. McDougall
ATTORNEY

Oct. 2, 1945.     L. E. COFFELT     2,385,967
WATERWHEEL MOUNTING
Filed Sept. 29, 1944     2 Sheets-Sheet 2
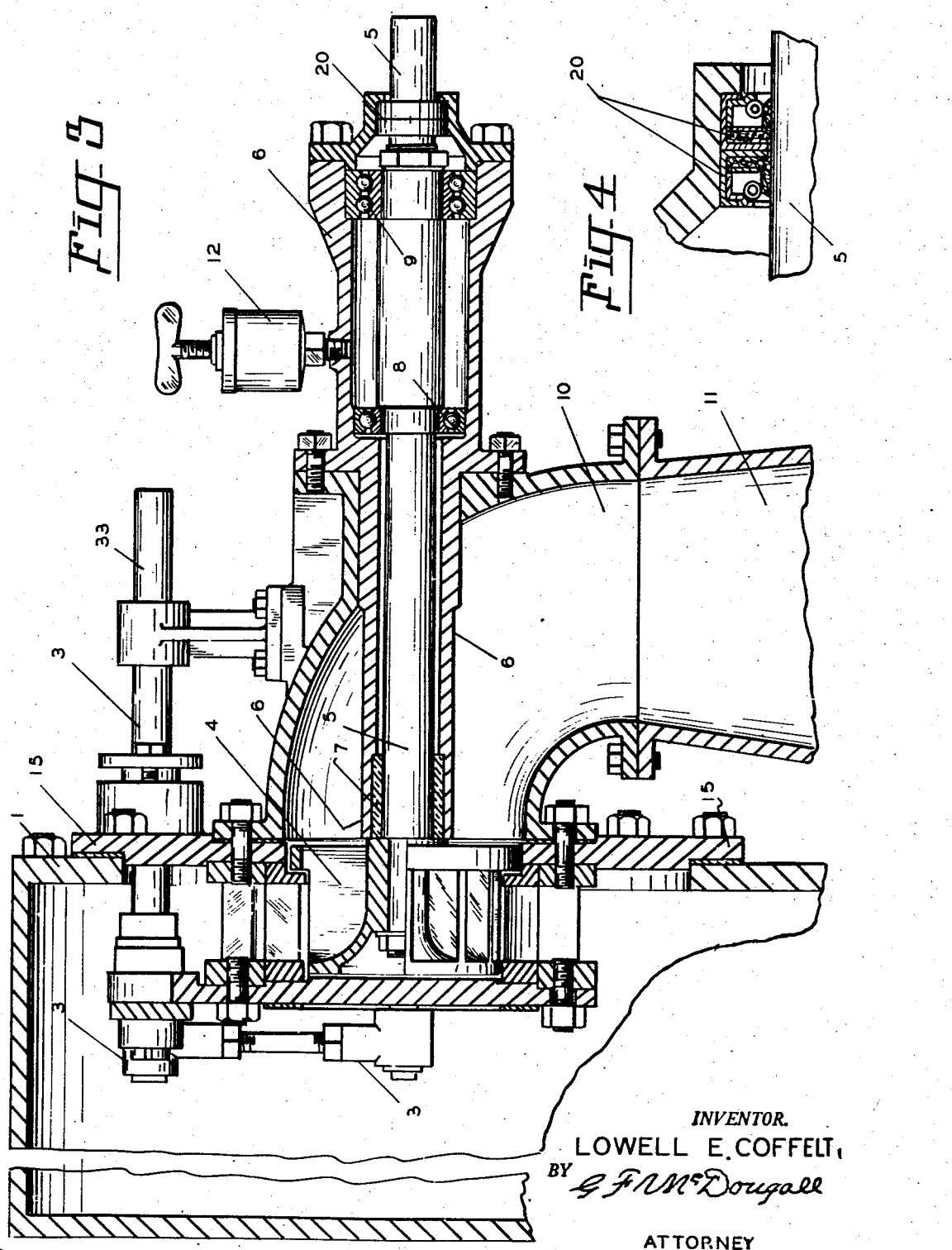
INVENTOR.
LOWELL E. COFFELT,
BY *G. F. McDougall*
ATTORNEY Patented Oct. 2, 1945

2,385,967

UNITED STATES PATENT OFFICE 2,385,967

WATERWHEEL MOUNTING

Lowell E. Coffelt, Portland, Oreg.

Application September 29, 1944, Serial No. 556,355

4 Claims. (Cl. 253—117)

This invention relates to a shaft mounting for waterwheels, particularly for relatively small water turbine installations for isolated farms, mountains resorts and other places that do not justify long transmission lines.

The overall object of the invention is to render a water turbine capable of much longer efficient life than heretofore. The weak point has always been the fact that water supplies for the type of installations referred to invariably carry sand, rock detritus and other abrasive substances that cut out inner bearings of the turbine and the shaft upon which it turns, which in turn destroy the fine clearances of the turbine in its ring and resultant contact rapidly destroys the machine.

The object of the invention is to supply a complete remedy for this condition by a structure that will completely prevent abrasives from entering the shaft bearings.

It has been known, objectively, for a long time that abrasives will destroy inner bearings and shafting, and inner packings have often been proposed for the purpose, but the packings themselves are vulnerable and fail to last; abrasives enter through them to the vital parts of the machine and being inside of the turbine case, usually the first intimation of anything wrong is a falling off in efficiency that can not be remedied except by expensive replacements; which disadvantageous combination of circumstances and ineffective remedy, this invention proposes to completely remedy.

The invention herein contemplates employment of a suction draft tube with cooperative structure, and the draft tube may add to the efficiency of the turbine, as such tubes are intended to do, but additionally it performs another function, considered essential to the long life of the turbine, that is believed to be novel and which will be explained in detail hereinafter.

Drawings accompany and form a part of this disclosure, illustrating a small turbine equipped with the invention in its best form according to experience so far developed.

In the drawings—

Fig. 3 is a longitudinal section with parts broken away showing Fig. 1 at increased scale for clarity; and Fig. 4 is an enlargement of the packing where the power shaft emerges from the torque tube.

Figure 1:
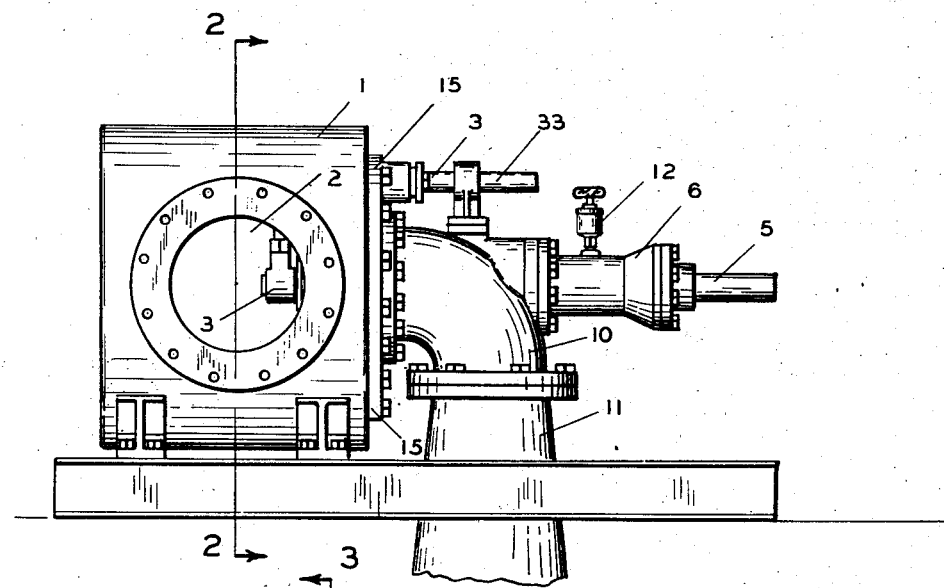
Fig. 1 is a view of a horizontal turbine with pressure and suction cases, a draft tube and extending power shaft within a torque tube.
Figure 2:
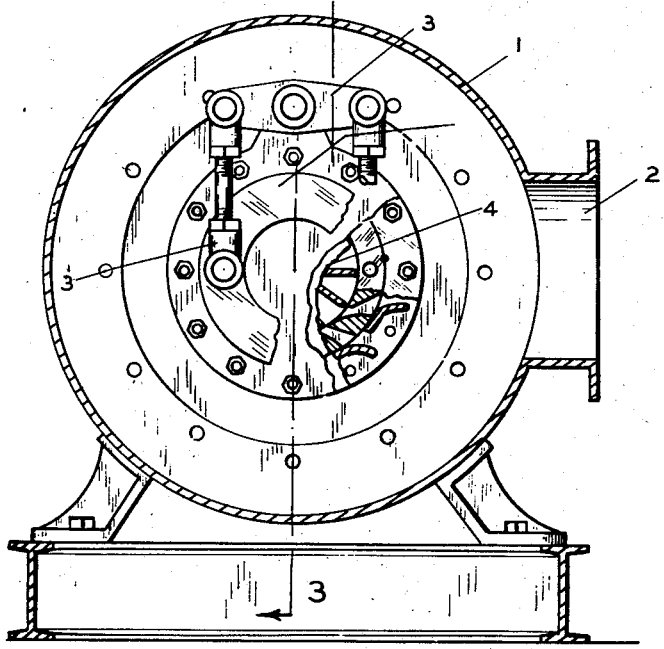
Fig. 2 is a section of Fig. 1 on the plane 2—2, Fig. 1.

Further describing the drawings, 1 is a pressure case having a flanged water inlet 2, through which is seen a part of the governing mechanism 3. A turbine 4 is mounted upon and drives a power shaft 5, the shaft in turn being journaled within the torque tube 6 upon suitable bearings such as the sleeve bearing 7, which it will be noted is in abutting relation to the hub of the turbine 4.

Radial antifriction bearings 8 and 9 support the opposite end of the power shaft 5. The torque tube 6, it will be observed, is partly within and partly outside of the suction case 10 and the turbine 4 is located between the two cases 1 and 10, and actually defines the adjacent limits of each case.

The suction case 10 is a suction case by virtue of a tapering draft tube 11; hence it will be seen that a partial vacuum exists within the suction case 10 at all times when the turbine is running and the lower end of the draft tube will be submerged as is well understood.

Means for supplying grease under pressure to the inside of the torque tube 6 is indicated by the compression grease cup 12 and unless the turbine is a large one, such a cup will be found adequate, continuous feed of grease not being required.

A governor will be applied to the protruding stub 33 of the governing mechanism, but being no part of the present invention, has not been detailed. It may be noted that the flanged joint 15 joins the pressure and suction cases and by dropping the draft tube 11, the suction case with the entire turbine mechanism can be detached and removed from the pressure case without disturbing the pipe line supposedly attached to the flange 2.

An important structure is the double seal 20 between the shaft 5 and the external terminus of the torque tube 6. This seals the torque tube against atmosphere while a vacuum (partial) exists in the suction case 10, which will be whenever the turbine is operating and if it is tight, grease cannot be drawn into the suction case to deplete the supply in the torque tube.

It will be obvious to those familiar with turbines that some delay always intervenes between starting the turbine and the establishment of actual suction in the suction case. At such short intervals, the outer end of the torque tube will have to be sealed against pressure or gritty water can and probably will be forced into the sleeve bearing 7 at the time when, due to greatest flow, gritty conditions may be at their worst; but the double seal 20, remote from the abutting end of the bearing 7, working properly and grease being incompressible, no grit can enter the sleeve 7.

Those in charge of starting should be instructed to first force in a small amount of grease and start the turbine. It is possible then for a few grains of grit to lodge in the grease at the abutting end of the sleeve 7, but after the turbine starts and accepts its load, it may be taken for granted that suction exists in the suction chamber and a slight additional amount of grease will be forced in, extruding through the sleeve 7 and discharging to waste any particles of grit that might have found lodgment inside of the sleeve 7, whereupon the turbine should be grit proof and adequately greased for a twenty-four hour run.

While the turbine is shown to be horizontal, only slight change in design and none in principle will be required to make it in another suitable form, as may be convenient, and a turbine so made may be expected to last much longer without requiring renewal of working parts and to give better efficiency in the meantime.

Having fully disclosed my invention so that those familiar with the arts concerned may make use of it, what I claim as new and desire to secure by Letters Patent is:

1. A water turbine comprising a pressure case, a suction case, a dependent draft tube and a turbine wheel revolubly mounted between the cases above the draft tube, the said turbine mounted on a power shaft, said shaft journaled within a torque tube that abuts the turbine wheel with one end, the other end provided with a power shaft opening, sealed against pressure in or out, there being a bearing at said abutting end and means for forcing grease under pressure into the torque tube between the ends.

2. In a water operated turbine wheel having a pressure case, a suction case under influence of a draft tube and a turbine wheel therebetween, a shaft upon which the turbine wheel is mounted, said shaft being partly within and partly without the turbine with its inner part exclusively within the suction portion, a torque tube covering part of the shaft within and without the suction case, said outside part sealed between the shaft and tube against pressure in or out, said inside end of the torque tube exposed to suction influence, shaft bearings within the torque tube and means irreversible by pressure for supplying grease under pressure to the shaft bearings within the tube.

3. A water wheel having a water case, a waterwheel operatively mounted therein, said case provided with suction producing means and said waterwheel dividing the said case into pressure and suction portions, a waterwheel shaft upon which said wheel is mounted that in part traverses the suction portion of the case, a torque tube within which said shaft is journaled, the said torque tube sealed at its end furthest from the waterwheel, exposed to suction influence at the inside end and provided with means for receiving grease under pressure at a point between the two ends.

4. Waterwheel apparatus, comprising a water case, a waterwheel mounted therein, responsive to flow through the case, said case divided into suction and pressure parts that are detachably attached together by a flange connection, said flange having an enlarged outstanding central portion, within which the water wheel is mounted to in part form division means between the suction and pressure parts, said wheel mounting including a torque tube that extends through said outstanding central portion, a power shaft journaled in said torque tube, double direction sealing means between the shaft and tube at the outside end, the inside end unsealed and pressure grease supplying means arranged to supply grease between the two ends.

LOWELL E. COFFELT.